United States Patent [19]

Okada et al.

[11] Patent Number: 5,369,183

[45] Date of Patent: Nov. 29, 1994

[54] COMPOSITE AND MOLDING FROM THE COMPOSITE

[75] Inventors: Masashi Okada; Tetsuo Maeda; Kenji Nakamura; Kenichi Hibino, all of Kyoto, Japan

[73] Assignee: Sanyo Chemical Industries, Ltd., Kyoto, Japan

[21] Appl. No.: 593,873

[22] Filed: Oct. 5, 1990

[30] Foreign Application Priority Data

| Oct. 9, 1989 | [JP] | Japan | 1-263548 |
| Oct. 9, 1989 | [JP] | Japan | 1-263549 |
| Oct. 11, 1989 | [JP] | Japan | 1-264322 |
| Oct. 11, 1989 | [JP] | Japan | 1-264323 |
| Oct. 12, 1989 | [JP] | Japan | 1-265829 |
| Jan. 23, 1990 | [JP] | Japan | 2-14045 |
| Jan. 23, 1990 | [JP] | Japan | 2-14046 |
| Jun. 20, 1990 | [JP] | Japan | 2-162472 |
| Jun. 20, 1990 | [JP] | Japan | 2-162473 |

[51] Int. Cl.$^5$ .................. C08F 259/04; C08F 283/00; C08F 265/06; B32B 27/00
[52] U.S. Cl. .................. 525/289; 525/290; 525/293; 525/296; 525/297; 525/309; 525/312; 525/317; 428/480; 428/500; 106/38.22
[58] Field of Search .............. 525/289, 296, 297, 293, 525/309, 312, 317, 290; 428/480, 500; 106/38.22

[56] References Cited

U.S. PATENT DOCUMENTS

| 3,390,115 | 6/1968 | Hagemeyer, Jr. et al. | 260/31.6 |
| 3,694,525 | 9/1972 | Horino et al. | 260/899 |
| 3,873,644 | 3/1975 | Pampus et al. | 525/297 |
| 3,904,708 | 9/1975 | Kennedy et al. | 525/297 |
| 3,962,198 | 6/1976 | Wada et al. | 525/297 |
| 4,316,978 | 2/1982 | Kennedy et al. | 525/297 |
| 4,708,994 | 11/1987 | Wong | 525/297 |
| 4,963,594 | 10/1990 | Gay | 524/305 |
| 5,080,968 | 1/1992 | Riew et al. | 525/317 |

FOREIGN PATENT DOCUMENTS

| 2100047 | of 1972 | France . |
| 2231690 | of 1974 | France . |
| 50-27846 | of 1975 | Japan . |
| 62-28008 | of 1987 | Japan . |
| 1337693 | 11/1973 | United Kingdom . |

*Primary Examiner*—Vasu S. Jagannathan
*Attorney, Agent, or Firm*—Birch, Stewart, Kolasch & Birch

[57] ABSTRACT

A composite for moldings having the high bending elastic modulus and the high bending strength, comprising a thermoplastic resin and a polymerizable monomer which is a multifunctional polymerizable monomer having an alicyclic strucure unit or a mixture consisting of a multifunctional polymerizable monomer having an alicyclic strucure unit and a monofunctional polymerizable monomer having at least two alicyclic structure units, is prepared by compounding them. Also, a composite for moldings having the high bending elastic modulus and the high bending strength, comprising a vinyl chloride resin, a (meth)acrylate monomer which is a multifunctional (meth)acrylate or a mixture consisting of a multifunctional (meth)acrylate and a monofunctional (meth)acrylate, and a polymerization initiator. The composite has good workability. Further, an unfluid precursor for moldings is prepared by heating the composite. The obtained moldings have high bending modulus of elasticity and high bending strength, and then are suitably applied to business machines, parts of electric equipment, industrial equipment, and parts of transport equipment etc.

12 Claims, No Drawings

COMPOSITE AND MOLDING FROM THE COMPOSITE

BACKGROUND OF THE INVENTION

This invention relates to a composite for moldings, and relates to a molding of a new crosslinked polymer prepared with the composite for moldings. More specifically, it relates to a molding having high elastic modulus and strength, and also relates to a composite for preparing the molding.

The composite for moldings includes a composite containing a reinforcing glass fiber used to prepare fiber reinforced plastics. Also, it includes a composite for moldings, from which the fluidity is eliminated and the plasticity of which is furnished by means of heating the composite for moldings in order to mold the composite more easily to the moldings, in other words, a precursor, which is more suitable for the preparation of moldings.

It is known now that there is a plastisol composite of relatively low viscosity for moldings, comprising vinyl chloride resins and plasticizers or which have a part replaced with a monomer of methacrylic esters, such as trimethylolpropane trimethacrylate, neopentylglycol dimethacrylate, etc.

It is also known that there are vinyl chloride resins of which the thermal resistance and the strength are improved by adding a small quantity of a monomer of methacrylic esters, such as trimethylolpropane trimethacrylate, neopentylglycol dimethacrylate, etc., to conventional vinyl chloride resins.

Although the plastisol composite for moldings, however, did not have poor molding workability, the moldings obtained did not have high elastic modulus or high strength. There has been a demand, therefore, for a composite for moldings, with which moldings having higher elastic modulus and higher strength then hitherto can be prepared. Also, the above-mentioned vinyl chloride resins, to which a monomer of methacrylic ester was added, were a compound for moldings having high elastic modulus and high strength, but having too high a viscosity to mold, and having poor molding workability. Therefore, there has been a demand for a composite for moldings, which allows easy molding operations.

This invention has been completed by studying a composite for moldings, which has good molding workability and gives moldings of high elastic modulus and high strength.

SUMMARY OF THE INVENTION

This invention relates to a composite for moldings comprising:
at least a thermoplastic resin (A) and
a polymerizable monomer system (B) which is at least a multifunctional polymerizable monomer having an alicyclic strucure unit ($B_1$) or a mixture consisting of ($B_1$) and at least a monofunctional polymerizable monomer having at least two alicyclic structure units ($B_2$), wherein the weight ratio of (A) to (B), based on the total weight of (A) and (B), ranges from 20:80 to 80:2. The present invention also relates to a molding prepared with the composite by means of molding and curing.

In addition, this invention relates to a composite for moldings having bending elastic modulus of at least 300 kg/mm$^2$ and bending strength of at least 8 kg/mm$^2$, comprising:
a thermoplastic vinyl chloride resin ($A_1$),
a polymerizable (meth)acrylate monomer system (C) which is a multifunctional polymerizable (meth)acrylate monomer ($C_1$) or a mixture consisting of ($C_1$) and a monofunctional polymerizable (meth)acrylate monomer ($C_2$), wherein the weight ratio of ($A_1$) to (C), based on the total weight of ($A_1$) and (C), ranges from 20:80 to 80:20, and providing the viscosity of a mixture of ($A_1$) and (C) of not more than 3,000 centipoises at ambient temperature,
and a polymerization initiator.

It is an object of this invention to provide a molding comprising a new high molecular material having high bending elastic modulus and high bending strength.

Another object of this invention is to provide a composite for moldings, having lower viscosity and better molding workability.

Other objects and advantages of the present invention will become apparent from the detailed description to follow in conjunction with the appended claims.

DETAILED DESCRIPTION OF THE INVENTION

First of all, materials which constitute the composite for moldings of this invention are described in order.

Wherein, the meaning of abbreviations used hereinafter in the detailed description is as follows:
(A): at least a thermoplastic resin,
($A_1$): a vinyl chloride resin,
($B_1$): a multifunctional polymerizable monomer having an alicyclic structure unit,
($B_2$): a monofunctional polymerizable monomer having at least two alicyclic structure units,
(B): a polymerizable monomer system which is ($B_1$) or a mixture consisting of ($B_1$) and ($B_2$),
($C_1$): a multifunctional polymerizable (meth)acrylate monomer,
($C_2$): a monofunctional polymerizable (meth)acrylate monomer,
(C): a polymerizable (meth)acrylate monomer system which is ($C_1$) or a mixture consisting ($C_1$) and ($C_2$),
(meth)acrylate: acrylate and/or methacrylate,
(meth)acrylic acid: acrylic and/or methacrylic acid.

The thermoplastic resin (A) as a component of the composite for moldings of this invention is not particularly limited, but is exemplified by vinyl chloride resin, ABS, MBS, NBR, PMMA, polycaprolactone, saturated polyester, polyethylene, polypropylene, chlorinated polyolefin, and nylon. These can be used individually or in a mixture thereof.

Also, a thermosetting resin, such as epoxy resin, alkyd resin, etc., can be used together with the above-mentioned thermoplastic resin.

Vinyl chloride resins are preferable among the above resins. Vinyl chloride resins are exemplified by vinyl chloride homopolymer, vinyl chloride copolymer with other vinyl monomers, such as vinyl acetate, vinylidene chloride, (meth)acrylic acid, methyl (meth)acrylate, butyl (meth)acrylate, vinyl propionate, etc., and the chlorinated compounds of these polymers.

The particularly preferable is vinyl chloride homopolymer and copolymers containing vinyl chloride of more than 70 weight percent based on the total weight of copolymer.

The degree of polymerization of vinyl chloride resins is not particularly limited, but usually ranges from 300~10,000, preferably from 500~6,000.

The multifunctional polymerizable monomer having a alicyclic structure unit ($B_1$) of this invention is not particularly limited, but examples are given by the monomers indicated by general formulae (1), (2), and (3).

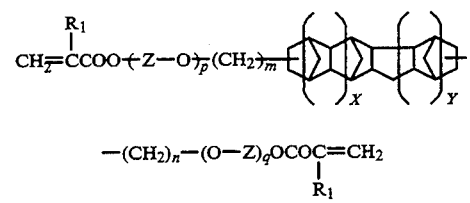

(1)

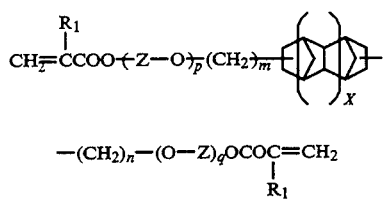

(2)

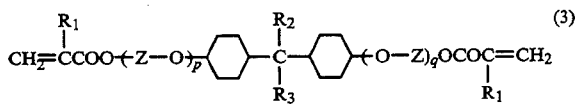

(3)

Wherein, $R_1$, $R_2$ and $R_3$ are each hydrogen or a methyl group, Z is an ethylene or a propylene group, p and q are each a number from 0 to 10 based on mole average value, m and n are each an integer from 0 to 2, and, x and y are each an integer from 0 to 3.

In the general formulae, p and q are preferably each a number from 0 to 5 based on mole average value, m and n are preferably each an integer of 0 or 1, and, x and y are preferably each an integer from 0 to 2.

Also, a reaction product of alicyclic polyisocyanates, such as isophorone diisocyanate and dicyclohexylmethane diisocyanate, etc., with (meth)acrylates containing hydroxyl group, for example, 2-hydroxylethyl (meth)acrylate, etc., or (meth)acrylic acid, and a reaction product of alicyclic polyamines, such as isophorone diamine, dicyclohexyldiamine, etc., with (meth)acrylic chloride can be used.

Particularly preferable compounds indicated by the general formula (1), are, for example, bis[(meth)acryloyloxy]tricyclo[5,2,1,0$^{2.6}$]decane (p, m, n, q, x and y are each zero) and bis[(meth)acryloyloxymethyl]tricyclo[5,2,1,0$^{2.6}$]decane (p, q, x and y are each zero, and, m and n are each 1). Particularly preferable compounds indicated by the general formula (2) are bis[(meth)acryloyloxy]tetracyclo[4,4,0,1$^{2.5}$,1$^{7.10}$]dodecane (p, m, n and q are each zero, and, x is 1) and bis[(meth)acryloyloxymethyl]tetracyclo [4,4,0,1$^{2.5}$,1$^{7.10}$]dodecane (p and q are each zero, and, m, n and x are each 1). Particularly preferable compounds indicated by the general formula (3) are (meth)acrylic esters of ethylene oxide and/or propylene oxide adducts (p and q are each from 0 to 5) of hydrogenated bisphenol A.

The monofunctional polymerizable monomer having at least two alicyclic structure units (including bicyclic ring), ($B_2$), is not particularly limited, but examples given by monomers indicated by general formulae (4), (5) and (6):

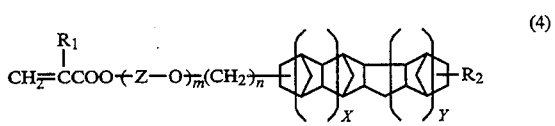

(4)

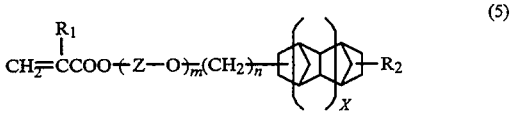

(5)

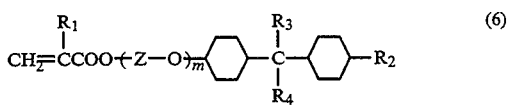

(6)

wherein. $R_1$, $R_3$ and $R_4$ are each hydrogen or a methyl group. $R_2$ is hydrogen or a hydroxyl group, Z is an ethylene or a propylene group, m is a number from 0 to 10 based on a mole average value, n is an integer from 0 to 2, and, x and y are each an integer from 0 to 3; m is preferably a number from 0 to 5 based on a mole average value, n is preferably an integer, 0 or 1, and, x and y are preferably each an integer from 0 to 2.

Examples include dicyclopentanyl (meth)acrylate for the general formula (4), norbornyl (meth)acrylate for the general formula (5), and mono(meth)acrylate of hydrogenated bisphenol A for the general formula (6).

Also, other monofunctional polymerizable monomers having at least two alicyclic structure units are exemplified by isobornyl (meth)acrylate, dicyclopentenyl (meth)acrylate hydrogenated naphthyl (meth)acrylate, etc. The preferable among these monomers are monomers shown by the general formulae (4), (5) and (6).

Another polymerizable monomer may be added to the composite for moldings of this invention which comprises a vinyl chloride resin and (B). In this case, (B) must be contained in an amount not less than 5% by weight, preferably not less than 10% by weight, based on the total weight of polymerizable monomers.

In the composite for moldings of this invention, which comprises a vinyl chloride resin and (B), the weight ratio of vinyl chloride resin to (B) is usually 20:80~80:20, preferably 30:70~70:30 respectively. When the weight ratio of vinyl chloride resin is less than 20, the cured molding becomes brittle. On the other hand, when the vinyl chloride resin used in a weight ratio over 80%, the elastic modulus and the strength of obtained molding are lowered.

Further, in this invention, in place of (B), a (meth)acrylate (C), which is selected from a group consisting of multifunctional (meth)acrylates and mixtures of a multifunctional (meth)acrylate and a monofunctional (meth)acrylate, can be used. In this case, it is preferable to use vinyl chloride resin as a thermoplastic resin (A).

The monofunctional (meth)acrylates include 2-ethylhexyl (meth)acrylate and (meth)acrylic esters of an alkylene oxide adduct (such as ethylene oxide adduct, propylene oxide adduct) of 2-ethylhexanol, phenol, or alkylphenol, which usually has from 1 to 20 carbon atoms in the alkyl group, etc.

The multifunctional (meth)acrylates include (meth)acrylic esters of 1,4-butylene glycol, neopentyl glycol, 1,6-hexane glycol, trimethylolpropane, pentaerythritol, dipentaerythritol and alkylene oxide adducts of these polyols, etc.

In the composite for moldings of this invention, which comprises vinyl chloride resins and (meth)acrylates (C), which replaced (B), the weight ratio of vinyl chloride resins to (meth)acrylates (C) is usually 20:80~80:20, preferably 30:70~70:30.

When the ratio of vinyl chloride resins (meth)acrylates (C) is less than 20, the cured molding becomes brittle. When this ratio is over 80, the elastic modulus and the strength of molding are lowered.

Also, from the viewpoint of processing, it is preferable that the viscosity of the mixture of (A), (C) and a polymerization initiator is not more than 3,000 centipoises at ambient temperature.

(Meth)acrylate (C) can be used together with (B). In this case, the weight ratio of vinyl chloride resins to the sum total of (C) and (B) is usually 20:80~80:20, preferably 30:70~70:30.

To the composite for moldings which comprises vinyl chloride resins and (C), the other polymerizable monomers may be added. However, (C) and (B) must be contained in amounts not less than 5% by weight, preferably not less than 10% by weight to the total weight of polymerizable monomers.

In order to improve the impact resistance of moldings prepared with the composite for moldings of this invention, a polymerizable monomer containing polar groups such as hydroxyl, carboxyl, amino, sulfonic or phosphoric groups, may be added to the composite.

The examples of polymerizable monomers containing a hydroxyl group are hydroxyalkyl (meth)acrylates (the carbon number of alkyl group usually ranges from 2 to 4), ethylene oxide, propylene oxide, and/or caprolactone adducts of hydroxyalkyl (meth)acrylates, etc.

The examples of polymerizable monomers containing a carboxyl group are the esters of (meth)acrylic acid or hydroxyalkyl (meth)acrylate with polybasic acids and/or their anhydrides, such as (meth)acryloyloxyethyl hydrogen succinate and (meth)acryloyloxyethyl hydrogen isophthalate, etc.

Examples of polymerizable monomers containing an amino group are dialkyl(wherein, the carbon number of alkyl usually ranges from 1 to 4) aminoalkyl (wherein, the carbon number of alkyl group usually ranges from 2 to 4) (meth)acrylate, etc.

Examples of polymerizable monomers containing a phosphoric group are ethylene oxide modified phosphoric (meth)acrylate,

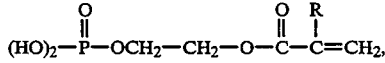

wherein R indicates a hydrogen atom or a methyl group, ethylene oxide modified phosphoric di(meth)acrylate, etc.

Examples of polymerizable monomers containing a sulfonic group are vinyl sulfonic acid, (meth)acrylamidopropanesulfonic acid, etc.

Further, in order to improve the heat resistance of moldings prepared with the composite for moldings of this invention, (meth)acrylates containing an isocyanuric ring may be added to the composite.

Examples of (meth)acrylates containing an isocyanuric ring are bis[(meth)acryloyloxyethyl]isocyanurate, bis[(meth)acryloyloxypropyl]isocyanurate, tris[(meth)acryloyloxyethyl]isocyanurate, tris[(meth)acryloyloxypropyl]isocyanurate and di- and/or tri-(meth)acrylates of alkylene oxide adducts (such as ethylene oxide and propylene oxide, etc.) and those of lactone adducts (such as caprolactone, etc.) to tris[hydroxyalkyl]isocyanurate (where, the carbon number of alkyl group usually ranges from 2 to 3).

For the composition for moldings of this invention, a publicly known thermal polymerization initiator and/or a photopolymerization initiator can be applied. The initiator is usually added in amounts of 0~10 parts by weight, preferably 0.05~5 parts by weight, to 100 parts by weight of polymerizable monomers in the composite. However, when the composite is cured by means of radiation except ultraviolet rays, for example, an electron beam, neutron rays and γ-rays, the addition of initiator is usually unnecessary.

The initiators for thermal polymerization include peroxides such as ketone peroxides (methylethylketone peroxide, acetylacetone peroxide, etc.), peroxyketals (1,1-bis-[t-butylperoxy]cyclohexanone, 2,2-bis[t-butylperoxy]-octane, etc.), hydroperoxides (t-butyl hydroperoxide, cumene hydroperoxide, etc.), dialkyl peroxides (dicumyl peroxide, etc.), diallyl peroxides (acetyl peroxide, benzoyl peroxide, etc.), peroxydicarbonates (di-n-propyl peroxydicarbonate, diallyl peroxydicarbonate, etc.) and peroxyesters (t-butyl peroxyacetate, t-butyl peroxybenzoate, t-butyl peroxyethylhexanate. etc.), and azo compounds, such as azobisisobutyronitrile.

The initiators for photopolymerization include benzoin alkyl ether, benzyldimethylketal, 1-hydroxycyclohexyl phenyl ketone, 2-hydroxy-2-methyl-1-phenyl-propan-1-one and benzophenone.

When an initiator for thermal polymerization is used, publicly known curing accelerators, for example, metal soaps, such as cobalt naphthenate, and tertiary amines, such as dimethyl aniline, may be used together in order to accelerate curing.

The composite for moldings of this invention can be compounded with a reinforcing fiber to enhance the strength and the elastic modulus of the moldings. The preferred reinforcing fiber is a fiber of glass, carbon, polyamide are polyimide. Particularly preferable is glass and carbon fibers. Also, a surface-treated fiber can be preferably used in order to improve the adhesive properties of the resin components.

The form of the reinforcing fibers is not limited, but examples include, a glass fiber such as a chopped strand, a milled fiber, a roving cloth, a cloth, a chopped strand mat, a continuous strand mat and nonwoven fabrics. Preferable among these are a chopped strand, a roving cloth and a chopped strand mat.

In order to obtain a fiber-filled composite by compounding with a reinforcing fiber, the reinforcing fiber of 15~300 parts by weight, preferably 20~200 parts by weight, is compounded with 100 parts of the total of (A) and polymerizable monomers. A molding compounded with less than 15 parts by weight of reinforcing fiber has poor reinforced characteristics.

A filler can be compounded to prepare a composite for moldings of this invention in accordance with the application object of preparing moldings. The filler is exemplified by silicate salts, such as aluminum silicates (clay, bentonite, feldspar, mica, etc.), hydrous aluminum silicates (kaolin, agalmatolite clay, etc.), magnesium silicates (talc, asbestos, etc.), calcium silicate, pumice powder etc.], silicic acids (silica sand, quartz powder, diatomaceous earth, etc.), metal oxides (alumina, titanium oxide, magnesium oxide, zinc oxide, etc.), carbonate salts (calcium carbonate, barium carbonate, magnesium carbonate, etc.), sulfates (barium sulfate, magnesium sulfate, etc.), hydroxides (calcium hydroxide, magnesium hydroxide, etc.), carbon (carbon black, graphite, etc.) and metal powders (iron powder, copper powder, aluminum powder, stainless steel powder, etc.).

Furthermore, for the purpose of reducing the specific density of tile composite for moldings, balloons such as glass balloon, siliceous balloon, phenol balloon, etc., can be compounded.

The ratio of compounded filler to composite is 0~200 parts by weight, preferably 10~180 parts by weight to 100 parts by weight of the total of thermoplastic resins and polymerizable monomers. When an amount of filler over 200 parts by weight are compounded with a composite, the viscosity of the composite becomes too high to impregnate a reinforcing fiber, and it becomes very hard to process a molding.

When a polymerization initiator and a reinforcing fiber are added to a composite for moldings of this invention, comprising vinyl chloride resins and (C), the preferable double bond equivalent of the composite is not more than 3 milliequivalents/gram, particularly not more than 2.5 milliequivalents/gram.

A double bond equivalent is defined as the equivalent of a polymerizable group, e.g., $CH_2|CR-CO-$; R indicates a hydrogen atom or a methyl group, per gram of the composite.

When the double bond equivalent of the composite exceeds 3 milliequivalents/gram, vinyl chloride resins are deteriorated, or the molding becomes burnt due to the heat of polymerization of (meth)acrylate during the course of curing.

The double bond equivalent of the composite for moldings is determined by publicly known methods, and can be calculated if the double bond equivalents of polymerizable monomers used are known.

Methods for keeping the double bond equivalent of the composite at not more than 3 milliequivalents/gram, include ① by increasing the contents of vinyl chloride resins, reinforcing fiber and/or fillers to keep the ratio within the above range, and ② using polymerizable monomers which have higher molecular weights per double bond in the monomers. The methods ① and ② can be applied individually or together.

In order to improve the mold-releasing property of the moldings from the composite of this invention, an internal mold-releasing agent can be incorporated. The internal mold-releasing agent is not particularly limited, but is exemplified by metal carboxylates, hydroxycarboxylic amides, bisamides, hydrogenphosphate esters and their metal soaps, higher fatty acids, higher fatty acid esters, higher alcohols and their alkylene oxide adducts, waxes, mineral oils, alkyl-siloxanes, etc., preferably metal carboxylates.

The particularly preferable metal carboxylates are the metal soaps of higher fatty acids which are salts of unsubstituted higher fatty acids, such as stearic acid, oleic acid, palmitic acid, lauric acid, linolenic acid, hydroxystearic acid, etc., with metals, such as lithium, sodium, potassium, calcium, barium, magnesium, copper, zinc, aluminum, chromium, iron, cobalt, nickel, tin, lead, etc. These internal mold-releasing agents can be incorporated individually or together.

Also, publicly known additives to vinyl chloride resins, for example, stabilizers (metal soaps, epoxy stabilizers, organo-tin stabilizers, cadmium-barium stabilizers, lead stabilizers. etc.), plasticizers (dioctyl phthalate, dioctyl adipate, etc.), coloring agents, surface active agents, thickeners, foaming agents, etc., may be added.

The method for preparing a molding from the above-mentioned composite for moldings of this invention is described as follows.

The composite for moldings of this invention may be converted into a plasticized composite that is not fluid, i.e., a precursor, by heating without substantial polymerization. The precursor is not substantially fluid at ambient temperature. The heating conditions to convert it to a precursor are usually 40°~120° C., preferably 50°~90° C. The plasticized, not substantially fluid precursor obtained is very useful for improving the molding workability. The precursor can be molded by press molding, vacuum molding, etc.

On the other hand, the composite for moldings of this invention can be cured directly to moldings by irradiation. In this case, the radiations include an electron beam, neutron rays, γ-rays, ultraviolet rays, etc.

In addition, methods for preparing moldings by using the composite for moldings of the present invention are not particularly limited. There are various methods such as a method wherein the composite for moldings is put into a mold under atmospheric pressure, or, if necessary, under pressure, or is put into a mold being kept under reduced pressure, and then cured by heating; a method wherein, the composite is formed into a desirable shape, such as sheet, a lump, etc. and cured by heating in a mold; and a method wherein the composite is converted into a precursor by means of heating, and the precursor is cured by heating in a mold, etc. Examples of molding methods include casting molding, injection molding, reaction injection molding, resin injection, compression molding, extrusion molding, transfer molding. etc.

The curing temperature of the composite for moldings during molding is usually 40°~180° C., preferably 50°~160° C. When a precursor is cured, the temperature is 80°~180° C., preferably 100°~160° C. When a precursor it is cured by radiation, for example, by irradiation with an electron beam, the exposure is usually 0.1~50 Mrad, preferably 0.5~20 Mrad.

As described hereinfore, the molding being prepared with the composite for moldings of this invention is a new molding, and has higher elastic modulus and strength than moldings prepared with the polymers of common use. Also, when a molding is prepared by adding a reinforcing fiber, a molding having much higher elastic modulus and higher strength is obtained. Further, when a polymerizable monomer having a polar group is added to the composite, the impact resistance of a molding from the composite can be enhanced.

When (meth)acrylates having an isocyanuric ring are added, the thermal resistance of the molding can be improved. Also, by incorporating an internal mold-releasing agent, the mold-releasing property of the molding is improved and, accordingly, its molding characteristics are much improved.

In accordance with this invention, the obtained moldings, which are prepared by molding and curing the above composite for moldings, have high elastic modulus and high strength, and are suitably applied to parts and housings of business machines such as typewriters, printers, duplicators, etc.; to electric equipment for home use, such as stereo, televisions, videodecks; to parts of electric equipment such as switch boxes and insulating panels, etc.; to industrial equipment, such as pump casings and tanks, etc., and to parts of transport vehicles such as fenders, bumpers, etc.

The invention will be understood more readily with reference to the following examples; however, these examples are intended to illustrate the invention and are not to be construed to limiting the scope of the invention.

Methods of evaluation for the bending strength and the bending elastic modulus of moldings, which were employed in the examples, conforms to JIS (Japanese Industrial Standard) as follows:

A test piece of molding, of which the size is longer than 80 mm, 4±0.2 mm thick and 10±0.5 mm wide, is used. The test piece is supported with fulcrums between which the distance is (16×thickness)±0.5 mm and is loaded with a weight in the center of fulcrums. The loaded weight is measured until the test piece is broken. The bending strength and the bending elastic modulus are evaluated by the following formulae:

(Bending strength)

$$\sigma_{fB} = \frac{3PL_v}{2Wh^2}$$

$\sigma_{fB}$: Bending strength (kgf/mm$^2$)
P: Loaded weight when test piece is broken (kgf)
$L_v$: Distance between fulcrums (mm)
W: Width of test piece (mm)
h: Thickness of test piece (mm)
(Bending elastic modulus)

$$E_f = \frac{L_v^3}{4Wh^3} \times \frac{F}{Y}$$

$E_f$: Bending elastic modulus (kgf/mm$^2$)
$L_v$: Distance between fulcrums (mm)
W: Width of test piece (mm)
h: Thickness of test piece (mm)
F/Y: Gradient of a straight part of loaded weight-strain diagram (kgf/mm)

The viscosity of a composite for molding prepared in examples, was measured by a Brookfield viscometer at 25° C.

The double bond equivalent of the composite for moldings obtained in the examples, was determined by calculation from the sturucture of the monomers used.

The part in the examples indicates the part by weight.

EXAMPLE 1

This is an example of a composite for moldings of this invention comprising vinyl chloride resin as a thermoplastic resin (A) and a multifunctional polymerizable monomer having an alicyclic structure unit (B$_1$), of the general formula (1), and is an example of a molding of this invention prepared with the composite.

A composite for moldings of this invention was prepared by compounding the following components and by degassing them under reduced pressure.

| | |
|---|---|
| Vinyl chloride resin (degree of polymerization: 1,650) | 60 parts |
| Bis(methacryloyloxymethyl)tricyclo[5, 2, 1, 0$^{2,6}$]-decane | 40 parts |
| t-Butyl peroxybenzoate: | 0.4 part |
| Dibutyltin bis(isooctyl acetomercaptide) (as a stabilizer) | 0.6 part |

A sheet-shaped molding of this invention was obtained by filling a mold with the above composite, the mold being composed of two sheets of glass plate which had a clearance of 3 mm, and by curing it by means of heating at 130° C. for 5 minutes.

The bending modulus of elasticity and the bending strength of the molding obtained were measured. The results are shown in Table 1.

EXAMPLE 2

This is an example of a composite for moldings of this invention comprising vinyl chloride resin as a thermoplastic resin (A) and a multifunctional polymerizable monomer having an alicyclic structure unit (B$_1$), of general formula (1), and is an example of a precursor of this invention that is not fluid, prepared with the composite, and also is an example of a molding of this invention prepared with the precursor.

A composite for moldings was prepared with the following components in the same manner as Example 1.

| | |
|---|---|
| Vinyl chloride resin (degree of polymerization: 3,500) | 50 parts |
| Bis(acryloyloxymethyl)tricyclo[5, 2, 1, 0$^{2,6}$]decane | 50 parts |
| t-Butyl peroxybenzoate | 0.5 part |
| Dibutyltin bis(isooctyl acetomercaptide) | 0.5 part |

By filling a mold with the composite, the mold which was composed of two sheets of glass plate which had a clearance of 3 mm, and by heating it at 80° C. for 10 minutes, a precursor of this invention that was not fluid was obtained. Then by molding the precursor with a press at 130° C. for 5 minutes, a sheet-shaped molding was obtained.

The bending modulus of elasticity and the bending strength of the molding obtained were measured. The results are shown in Table 1.

EXAMPLE 3

This is an example of a composite for moldings comprising vinyl chloride resin as a thermoplastic resin (A) and a multifunctional polymerizable monomer having an alicyclic structure unit (B$_1$), of general formula (2), and is an example of a molding from the composite.

A composite for moldings was prepared in the same manner as Example 1, in which bis[methacryloyloxymethyl]-tetracyclo[4,4,0,1$^{2.5}$,1$^{7.10}$]dodecane replaced bis(methacryloyloxymethyl)tricyclo[5,2,1,0$^{2.6}$]decane in Example 1. A sheet-shaped molding was obtained by treating the composite in the same manner as Example 1.

The bending modulus of elasticity and the bending strength of the molding obtained were measured. The results are shown in Table 1.

EXAMPLE 4

This is an example of a composite for moldings comprising vinyl chloride resin as a thermoplastic resin (A), a multifunctional polymerizable monomer (B$_1$) of general formula (1), and a multifunctional methacrylate (C), and is an example of a precursor from the composite, and also is an example of a molding from the precursor.

A composite for moldings was prepared by the same procedure as in Example 1 with the components shown in Example 2, in which 50 parts of bis(acryloyloxymethyl)tricyclo[5,2,1,0$^{2.6}$]decane was replaced with 35 parts of bis(acryloyloxymethyl)tricyclo[5,2,1,0$^{2.6}$]decane and 15 parts of trimethylolpropane trimethacrylate.

A precursor was prepared by treating the composite, and a sheet-shaped molding was obtained by treating the precursor, in the same manner as in Example 2.

The bending modulus of elasticity and the bending strength of the molding obtained were measured. The results are shown in Table 1.

EXAMPLE 5

This is an example of a composite comprising vinyl chloride resin as a thermoplastic resin (A), a multifunctional polymerizable monomer ($B_1$) of general formula (3), and a methacrylate (C), and is an example of a molding from the composite.

A composite was prepared by using the following components in the same manner as in Example 1.

| | |
|---|---|
| Vinyl chloride resin (degree of polymerization: 1,650) | 60 parts |
| Dimethylacrylate of an ethylene oxide adduct to hydrogenated bisphenol A | 20 parts |
| Neopentylglycol dimethacrylate | 20 parts |
| t-Butyl peroxybenzoate | 0.4 part |
| Dibutyltin bis(isooctyl acetomercaptide) | 0.6 part |

A sheet-shaped molding was obtained by treating the composite in the same manner as in Example 1.

The bending modulus of elasticity and the bending strength of the molding obtained were measured. The results are shown in Table 1.

EXAMPLE 6

This is an example of a composite comprising vinyl chloride resin as a thermoplastic resin (A), a multifunctional polymerizable monomers ($B_1$) of general formula (1) and (3), and a methacrylate (C), and is an example of a precursor from the composite, and also is an example of a molding from the precursor.

A composite was prepared with the following components in the same manner as in Example 1.

| | |
|---|---|
| Vinyl chloride4 resin (degree of polymerization: 3,500) | 50 parts |
| Dimethacrylate of propyleneoxide adduct to hydrogenated bisphenol A | 15 parts |
| Bis(aryloxymethyl)tricyclo[5, 2, 1, $0^{2,6}$]decane | 15 parts |
| 1,6-Hexanediol dimethacrylate | 20 parts |
| t-Butyl peroxybenzoate | 0.5 part |
| Dibutyltin bis(isooctyl acetomercaptide) | 0.5 part |

A precursor was prepared by treating the composite, and then a sheet-shaped molding was obtained by treating the precursor, in the same manner as in Example 2.

The bending modulus of elasticity and the bending strength of the molding obtained were measured. The results are shown in Table 1.

EXAMPLE 7

This is an example of a composite comprising vinyl chloride resin as a thermoplastic resin (A), a monofunctional polymerizable monomer having at least two alicyclic structure units ($B_2$), and is an example of a molding from the composite.

A composite was prepared with the following components in the same manner as in Example 1.

| | |
|---|---|
| Vinyl chloride resin (degree of polymerization: 1,650) | 65 parts |
| Dicyclopentenyl methacrylate | 35 parts |
| t-Butyl peroxybenzoate | 0.4 part |
| Dibutyltin bis(isooctyl acetomercaptide) | 0.6 part |

A sheet-shaped molding was obtained by treating the composite in the same manner as in Example 1.

The bending modulus of elasticity and the bending strength of the molding obtained were measured. The results are shown in Table 1.

EXAMPLE 8

This is an example of a composite comprising polyamide resin as a thermoplastic resin (A) and a multifunctional polymerizable monomer ($B_1$) of general formula (1).

A composite was prepared in the same manner as Example 6, in which Nylon 6 (NYLON 6 P1011F: Ube Industries Ltd., Japan) was used in place of vinyl chloride resin in Example 6. A sheet-shaped molding was obtained by treating the composite in the same manner as in Example 1.

The bending modulus of elasticity and the bending strength of the molding obtained were measured. The results are shown in Table 1.

TABLE 1

| | Bending elastic modulus (Kg/mm$^2$) | Bending strength (Kg/mm$^2$) |
|---|---|---|
| Example 1 | 400 | 14 |
| Example 2 | 410 | 15 |
| Example 3 | 420 | 13 |
| Example 4 | 415 | 12 |
| Example 5 | 425 | 18 |
| Example 6 | 450 | 20 |
| Example 7 | 340 | 10 |
| Example 8 | 305 | 10 |

EXAMPLE 9

This is an example of a composite wherein a reinforcing fiber was added to the composite of Example 1, and is an example of a reinforced molding from the composite.

A composite was prepared by compounding the following components.

| | |
|---|---|
| Vinyl chloride resin (degree of polymerization: 1,650) | 60 parts |
| Bis(methacryloyloxymethyl)tricyclo[5, 2, 1, $0^{2,6}$]-decane | 40 parts |
| t-Butyl peroxybenzoate | 0.4 part |
| Dibutyltin bis(isooctyl acetomercaptide) | 0.6 part |

Then by impregnating 30 parts of glass fiber (a chopped strand, 25 mm long) with the composite, a sheet-shaped precursor, 4 mm thick, was prepared.

By putting the precursor into a mold and by heating under the conditions: 130° C., 30 Kg/cm$^2$ and 5 minutes, a fiber-reinforced molding of this invention was obtained.

The bending modulus of elasticity and the bending strength of the obtained fiber-reinforced molding were measured. The results are shown in Table 2.

EXAMPLE 10

This is an example of a composite in which a reinforcing fiber was added to the composite of Example 2, and is an example of a precursor from the composite, and is also an example of a reinforced molding from the precursor.

A composite was prepared by compounding the following components and by the same procedure as that of Example 9.

| | |
|---|---|
| Vinyl chloride resin (degree of polymerization: 3,500) | 50 parts |
| Bis(acryloyloxymethyl)tricyclo[5, 2, 1, 0$^{2,6}$]decane | 50 parts |
| t-Butyl peroxybenzoate | 0.5 part |
| Dibutyltin bis(isooctyl acetomercaptide) | 0.5 part |
| Glass fiber (a chopped strand, 25 mm long) | 30 parts |

A precursor was prepared by heating the composite at 80° C. for 10 minutes. Then by putting the precursor into a mold and by heating and pressing it under the conditions: 130° C., 30 Kg/cm$^2$ and 5 minutes, a fiber-reinforced molding was obtained.

The bending modulus of elasticity and the bending strength of the obtained fiber-reinforced molding were measured. The results are shown in Table 2.

EXAMPLE 11

This is an example of a composite in which a reinforcing fiber was added to the composite of Example 3 and is an example of a reinforced molding from the composite.

A composite and a molding of this invention were prepared by the same procedure as that of Example 9 and the components shown in Example 9, in which bis(methacryloyloxymethyl)tricyclo[5,2,1,0$^{2,6}$]decane was replaced with bis(methacryloyloxymethyl)tetracyclo[4,4.0,1$^{2,5}$,1$^{7,10}$]dodecane. By treating the composite in the same manner as in Example 8, a fiber-reinforced molding was obtained.

The bending modulus of elasticity and the bending strength of the obtained fiber-reinforced molding were measured. The results are shown in Table 2.

EXAMPLE 12

This is an example of a composite in which a reinforcing fiber was added to the composite of Example 4, and is an example of a precursor from the composite, and is also an example of a molding from the precursor.

A composite was prepared by the same procedure as that of Example 10 and the components shown in Example 10, in which 50 parts of bis(acryloyloxymethyl)tricyclo[5,2,1,0$^{2,6}$]decane was replaced with 35 parts of bis(acryloyloxymethyl)tricyclo-[5,2,1,0$^{2,6}$]decane and 15 parts of trimethylolpropane trimethacrylate. A precursor was prepared by the same procedure as Example 10. By treating the precursor in the same manner as in Example 10, a fiber-reinforced molding of this invention was obtained.

The bending modulus of elasticity and the bending strength of the obtained fiber-reinforced molding were measured. The results are shown in Table 2.

EXAMPLE 13

This is an example of a composite comprising vinyl chloride resin as a thermoplastic resin (A), a multifunctional polymerizable monomer (B$_1$) of general formula (1), a monomer shown by the general formula (3), a multifunctional methacrylate (C), and a reinforcing fiber, and is an example of a reinforced molding from the composite.

A composite and a fiber-reinforced molding of this invention were prepared by using the following components and by the same procedure as that of Example 10.

| | |
|---|---|
| Vinyl chloride resin (degree of polymerization: 1,650) | 50 parts |
| Dimethacrylate of a propylene oxide adduct to hydrogenated bisphenol A | 5 parts |
| Bis(methacryloyloxymethyl)tricyclo[5, 2, 1, 0$^{2,6}$]-decane | 5 parts |
| Trimethylolpropane triacrylate | 20 parts |
| t-Butyl peroxybenzoate | 0.4 parts |
| Dibutyltin bis(isooctyl acetomercaptide) | 0.6 part |
| Glass fiber (a chopped strand, 25 mm long) | 30 parts |

The bending modulus of elasticity and the bending strength of the obtained fiber-reinforced molding were measured. The results are shown in Table 2.

EXAMPLE 14

This is an example of a composite comprising vinyl chloride resin as a thermoplastic resin (A), a multifunctional polymerizable monomer (B$_1$) of general formula (1), a monomer of general formula (3), a multifunctional methacrylate (C), and a reinforcing fiber, and is also an example of a reinforced molding from the composite.

A composite, being composed of the following components, and a fiber-reinforced molding from the composite were prepared in the same manner as on Example 10.

| | |
|---|---|
| Vinyl chloride resin (degree of polymerization: 3,500) | 30 parts |
| Dimethacrylate of a propyleneoxide adduct to hydrogenated bisphenol A | 25 parts |
| Bis(acryloyloxymethyl)tricyclo[5, 2, 1, 0$^{2,6}$]decane | 15 parts |
| Neopentylglycol dimethylacrylate | 30 parts |
| t-Butyl peroxybenzoate | 0.5 parts |
| Dibutyltin bis(isooctyl acetomercaptide) | 0.5 part |
| Glass fiber (a chopped strand, 25 mm long) | 50 parts |
| Calcium carbonate | 50 parts |

The bending modulus of elasticity and the bending strength of the obtained fiber-reinforced molding were measured. The results are shown in Table 2.

REFERENCE EXAMPLE 1

A composite and a reinforced molding for reference were prepared in the same manner as in Example 9, in which neopentylglycol dimethacrylate was used in place of bis(methacryloyloxymethyl)tricyclo[5,2,1,0$^{2,6}$]-decane in Example 9.

The bending modulus of elasticity and the bending strength of the obtained fiber-reinforced molding were measured. The results are shown in Table 2.

REFERENCE EXAMPLE 2

A composite and a reinforced molding for reference were prepared in the same manner as Example 10, in which trimethylol-propane trimethacrylate was used in place of bis(acryloyloxymethyl) tricyclo[5,2,1,0$^{2,6}$]decane in Example 10.

The bending modulus of elasticity and the bending strength of the obtained fiber-reinforced molding were measured. The results are shown in Table 2.

TABLE 2

| | Bending elastic modulus (Kg/mm$^2$) | Bending strength (Kg/mm$^2$) |
|---|---|---|
| Example 9 | 1210 | 35 |
| Example 10 | 1340 | 37 |
| Example 11 | 1290 | 34 |
| Example 12 | 1170 | 32 |
| Example 13 | 1375 | 38 |
| Example 14 | 1415 | 41 |
| Reference ex. 1 | 820 | 19 |

TABLE 2-continued

| | Bending elastic modulus (Kg/mm$^2$) | Bending strength (Kg/mm$^2$) |
|---|---|---|
| Reference ex. 2 | 890 | 20 |

EXAMPLE 15

This is an example of a composite comprising a vinyl chloride resin, a multifunctional methacrylate and a polymerization initiator, and is also an example of a molding prepared with the composite.

A composite was prepared by compounding the following components and by degassing it under reduced pressure.

| | |
|---|---|
| Vinyl chloride resin (degree of polymerization: 1650) | 50 parts |
| Neopentylglycol dimethacrylate | 50 parts |
| t-Butyl peroxybenzoate | 0.5 part |
| Dibutyltin bis(isooctyl acetomercaptide) | 0.5 part |

The viscosity of the composite prepared was 1,800 centipoises.

A molding was prepared by pouring the composite into a mold which was composed of two sheets of glass plate having a clearance of 3 mm, and then by curing it by means of heating at 130° C. for 5 minutes.

The bending modulus of elasticity and the bending strength of the obtained molding were measured. The results are shown in Table 3.

EXAMPLE 16

This is an example of a composite comprising a vinyl chloride resin, multifunctional methacrylates and a polymerization initiator, and is also an example of a molding prepared with the composite.

A composite was prepared by compounding and treating the following components in the same manner as Example 15.

A molding was prepared by treating the composite, also in the same manner as in Example 15.

| | |
|---|---|
| Vinyl chloride resin (degree of polymerization: 3,500) | 55 parts |
| Neopentyl dimethacrylate | 25 parts |
| Trimethylolpropane triacrylate | 20 parts |
| t-Butyl peroxybenzoate | 0.5 part |
| Dibutyltin bis(isooctyl acetomercaptide) | 0.6 part |

The viscosity of the composite prepared was 2,900 centipoises.

The bending modulus of elasticity and the bending strength of the obtained molding were measured. The results are shown in Table 3.

EXAMPLE 17

A composite was prepared with the components in Example 15, in which neopentylglycol diacrylate replaced neopentylglycol dimethacrylate, and by carrying out the same procedure as that of Example 15.

The viscosity of the composite prepared was 2,000 centipoises.

A precursor was prepared by heating it at 80° C. for 10 minutes and then putting the precursor into a mold which was composed of two sheets of glass plate having a clearance of 3 mm.

A molding was prepared by molding and curing the precursor in a press at 130° C. for 5 minutes.

The bending modulus of elasticity and the bending strength of the obtained molding were measured. The results are shown in Table 3.

COMPARATIVE EXAMPLE 1

This is an example of a composite for comparison comprising a vinyl chloride resin, a multifunctional methacrylate and polymerization initiator and is also an example of a molding prepared with the composite. The molding obtained by this comparative example did not have high elastic modulus nor high elastic strength.

A composite for comparison was prepared with the following components by the same procedure as in Example 16.

The viscosity of the composite obtained was 1,600 centipoises.

| | |
|---|---|
| Vinyl chloride resin (degree of polymerization: 1,650) | 50 parts |
| Dioxtyl phthalate | 15 parts |
| Neopentylglycol dimethacrylate | 35 parts |
| t-Butyl peroxybenzoate | 0.5 part |
| Dibutyltin bis(isooctyl acetomercaptide) | 0.6 part |

A molding for comparison was prepared by treating the composite in the same manner as in Example 1.

The bending modulus of elasticity and the bending strength of the obtained molding were measured. The results are shown in Table 3.

COMPARATIVE EXAMPLE 2

This is an example of a composite for comparison comprising a vinyl chloride resin, a multifunctional methacrylate and a polymerization initiator. This composite had high viscosity.

A composite for comparison was prepared with the following components by the same procedure as in Example 1. However, the prepared composite had high viscosity, and hardly had fluidity at ambient temperature, and could not be poured into a mold.

| | |
|---|---|
| Vinyl chloride resin (degree of polymerization: 3,500) | 72 parts |
| Neopentylglycol dimethacrylate | 28 parts |
| t-Butyl peroxybenzoate | 0.5 part |
| Dibutyltin bis(isooctyl acetomercaptide) | 0.5 part |

TABLE 3

| | Bending elastic modulus (kg/mm$^2$) | Bending strength (kg/mm$^2$) |
|---|---|---|
| Example 15 | 340 | 11 |
| Example 16 | 360 | 13 |
| Example 17 | 310 | 9 |
| Comparative ex. 1 | 120 | 4 |

EXAMPLE 18

This is an example for examining double bond equivalent in a composite for moldings. A composite was prepared by blending vinyl chloride resin and acrylate with a polymerization initiator, a reinforcing fiber and a filler.

A sheet-shaped composite, 5 mm thick, was prepared by impregnating 30 parts of glass fiber (a chopped strand, 25 mm long) with a mixture obtained by blending the following components.

| | |
|---|---|
| Vinyl chloride resin (degree of polymerization: 1,650) | 25 parts |

-continued

| | |
|---|---|
| Propylene glycol diacrylate (molecular weight: about 300) | 10 parts |
| Diacrylate of adduct of 4 moles of ethylene oxide to bisphenol A | 15 parts |
| t-Butyl peroxybenzoate | 0.4 part |
| Calcium carbonate | 20 parts |
| Dibutyltin bis(isooctyl acetomercaptide) | 0.6 part |

The double bond equivalent of the composite was 1.2 milliequivalents/gram.

A fiber-reinforced molding was obtained by filling a metal mold with the composite and then by curing it by means of heating and pressing under the conditions of 130° C., 30 kg/cm$^2$, and 5 minutes.

The obtained molding was found to be neither discolored nor burnt at all. The bending elastic modulus of the molding was 1,170 kg/mm$^2$, and the bending strength was 31 kg/mm$^2$.

EXAMPLE 19

This is an example for examining double bond equivalent in a composite for moldings. A composite was prepared by blending vinyl chloride resin and acrylates with a polymerization initiator, a fiber and a filler.

A composite was prepared with the following components by the same procedure as in Example 18.

| | |
|---|---|
| Vinyl chloride resin (degree of polymerization: 3,500) | 30 parts |
| Diacrylate of adduct of 4 moles of ethylene oxide to bisphenol A | 20 parts |
| Diacrylate of adduct of two mole propylene oxide to neopentylglycol | 25 parts |
| t-Butyl peroxybenzoate | 0.3 part |
| Calcium carbonate | 10 parts |
| Dibutyltin bis(isooctyl acetomercaptide) | 0.3 part |
| Glass fiber | 35 parts |

A precursor was prepared by heating the composite at 80° C. for 10 minutes. The double bond equivalent of the composite was 2.3 milliequivalents/gram. A molding was prepared by curing the precursor in the same manner as Example 18.

The molding obtained was found to be neither discolored nor burnt at all. Besides, the bending elastic modulus of the molding was 1,380 kg/mm$^2$, and its bending strength was 39 kg/mm$^2$.

EXAMPLE 20

This is an example for examining double bond equivalent in a composite for moldings. A composite was prepared by blending vinyl chloride resin, a methacrylate, a polymerization initiator, a reinforcing fiber and a filler.

A composite and a molding from the obtained composite were prepared in the same manner as in Example 18, in which trimethacrylate of 3 mole propylene oxide adduct to trimethylol propane was substituted for propylene glycol diacrylate in Example 18.

The double bond equivalent of the composite was 1.6 milliequivalents/gram. The molding prepared was found to be neither discolored nor burnt at all. Besides, the bending elastic modulus of the molding was 1,290 kg/mm$^2$, and the bending strength was 36 kg/mm$^2$.

REFERENCE EXAMPLE 3

This is an example of composite having the double bond equivalent of over 3 milliequivalents/gram.

A composite and a molding for reference were prepared with the following components by the same procedure as that of Example 18.

| | |
|---|---|
| Vinyl chloride resin (degree of polymerization: 1,650) | 25 parts |
| Trimethylolpropane trimethacrylate | 50 parts |
| t-Butyl peroxybenzoate | 0.5 part |
| Dibutyltin bis(isooctyl acetomercaptide) | 0.6 part |
| Glass fiber (a chopped strand, 25 mm long) | 15 parts |

The double bond equivalent of the composite was 5.0 milliequivalents/gram. A burnt color overspread all the surface of the molding prepared.

REFERENCE EXAMPLE 4

This is an example of composite having the double bond equivalent of over 3 milliequivalents/gram.

A composite and a molding for reference were prepared by the same procedure as that of Example 16 with the components shown in Reference example 3, in which neopentylglycol dimethacrylate was substituted for trimethylolpropane trimethacrylate.

The double bond equivalent of the composite was 4.1 milliequivalent/gram. The molding prepared discolored to brown and had a partly burnt color.

EXAMPLE 21

This is an example of a molding of which the impact resistance was improved by adding a polymerizable monomer containing a carboxyl group as a polar group.

EXAMPLE 21-a

A composite for moldings was prepared by compounding the following components and by degassing it under reduced pressure.

| | |
|---|---|
| Vinyl chloride resin (degree of polymerization: 3,500) | 50 parts |
| Bis(acryloyloxymethyl)tricyclo[5,2,1,0$^{2,6}$]decane | 15 parts |
| 1,6-Hexanediol dimethacrylate | 30 parts |
| t-Butyl peroxybenzoate | 0.5 part |
| Dibutyltin bis(isooctyl acetomercaptide) | 0.5 part |

A precursor was prepared by heating it at 80° C. for 10 minutes and then putting the composite into a mold which was composed of two sheets of glass plate having a clearance of 3 mm.

A fiber-reinforced molding was prepared by heating and pressing the precursor in a metal mold under the conditions: 130° C., 50 kg/cm$^2$ and 5 minutes.

The bending modulus of elasticity, the bending strength and the impact resistance of the obtained molding were measured. The results are shown in Table 4.

EXAMPLE 21-b

In comparison with Example 21-a, a composite was prepared by the same procedure as Example 21-a with the components of Example 21-a to which 5 parts of methacryloyloxyethyl hydrogen succinate were added. A molding was prepared with the composite by the same procedure as Example 21-a.

The bending modulus of elasticity, the bending strength and the impact resistance of the obtained molding were measured. The results are shown in Table 4.

EXAMPLE 22

This is an example of a molding of which the impact resistance was improved by adding a polymerizable monomer containing a phosphoric group as a polar group.

EXAMPLE 22-a

A composite and a molding were prepared with the following components by employing the same procedure as that of Example 21.

| | |
|---|---|
| Vinyl chloride resin (degree of polymerization: 1,650) | 60 parts |
| Bis(methacryloyloxymethyl)tricyclo[5,2,1,0$^{2,6}$]decane | 15 parts |
| Dimethacrylate of a propylene oxide adduct to hydrogenated bisphenol A | 15 parts |
| Neopentylglycol dimethacrylate | 40 parts |
| t-Butyl peroxybenzoate | 0.4 part |
| Dibutyltin bis(isooctyl acetomercaptide) | 0.6 part |
| Glass fiber | 100 parts |

The bending modulus of elasticity, the bending strength and the impact resistance of the obtained molding were measured. The results are shown in Table 4.

TABLE 4

| | Impact resistance (Note 1) | Bending elastic modulus (kg/mm$^2$) | Bending strength (kg/mm$^2$) |
|---|---|---|---|
| Example 21-a | 2.5 | 395 | 16 |
| Example 21-b | 6.5 | 400 | 15 |
| Example 22-a | 99 | 1,415 | 44 |
| Example 22-b | 165 | 1,420 | 45 |

(Note 1): Izod impact test with notch (kg · cm/cm$^2$)

EXAMPLE 22-b

In comparison with Example 22-a, a composite was prepared with the components of Example 22-a to which 0.5 part of ethylene oxide modified phosphate monoacrylate was added. A molding was prepared with the composite by the same procedure as Example 22-a.

The bending modulus of elasticity, the bending strength and the impact resistance of the obtained molding were measured. The results are shown in Table 4.

EXAMPLE 23

This is an example of a molding of which the thermal resistance was improved by adding a (meth)acrylate having isocyanuric ring.

EXAMPLE 23-a

A composite was prepared with the following components by compounding and degassing them under reduced pressure.

| | |
|---|---|
| Vinyl chloride resin (degree of polymerization: 1,650) | 60 parts |
| Bis(methacryloyloxymethyl)tricyclo[5,2,1,0$^{2,6}$]decane | 20 parts |
| Neopentylglycol dimethacrylate | 35 parts |
| t-Butyl peroxybenzoate | 0.4 part |
| Dibutyltin bis(isooctyl acetomercaptide) | 0.6 part |

A molding was prepared by pouring the composite into a mold composed of two sheets of glass plate having a clearance of 3 mm, and then by curing it by means of heating at 130° C. for 5 minutes and then by demolding the molding.

The bending modulus of elasticity, the bending strength and the heat distortion temperature of the obtained molding were measured. The results are shown in Table 5.

EXAMPLE 23-b

A composite was prepared by the same procedure as Example 23-a with the components of Example 23-a to which 5 parts of tris(acryloyloxyethyl)isocyanurate were added. A molding was prepared with the composite by the same procedure as Example 25-a.

The bending modulus of elasticity, the bending strength and the heat distortion temperature of the obtained molding were measured. The results are shown in Table 5.

TABLE 5

| | Heat distortion temperature (°C.) | Bending elastic modulus (kg/mm$^2$) | Bending strength (kg/mm$^2$) |
|---|---|---|---|
| Example 23-a | 75 | 390 | 13 |
| Example 23-b | 98 | 395 | 16 |

EXAMPLE 24

This is an example of a molding of which the thermal resistance was improved by adding a (meth)acrylate having isocyanuric ring.

EXAMPLE 24-a

A sheet-shaped composite, 4 mm thick, was prepared by compounding the following components, and then by impregnating a glass fiber of 100 parts (a chopped strand, 25 mm long) with the compound.

| | |
|---|---|
| Vinyl chloride resin (degree of polymerization: 1,650) | 50 parts |
| Bis(methacryloyloxymethyl)tricyclo[5,2,1,0$^{2,6}$]decane | 5 parts |
| Dimethacrylate of a propylene oxide adduct to hydrogenated bisphenol A | 5 parts |
| Neopentylglycol dimethacrylate | 25 parts |
| t-Butyl peroxybenzoate | 0.4 part |
| Dibutyltin bis(isooctyl acetomercaptide) | 0.6 part |

A fiber-reinforced molding was prepared by filling a mold with the composite, and then by heating and pressing it under the conditions: 130° C., 50 kg/cm$^2$ and 5 minutes.

The bending modulus of elasticity and the bending strength at ambient temperature and at 160° C. were measured. The results are shown in Table 6.

EXAMPLE 24-b

A composite for reference was prepared by the same manner as Example 24-a with the components of Example 24-a to which 15 parts of tris(acryloyloxyethyl)isocyanurate were added. A molding was prepared with the composite by the same way in Example 24-a.

The bending modulus of elasticity and the bending strength at ambient temperature and at 160° C. were measured. The results are shown in Table 6.

TABLE 6

| Measured temperature | Bending elastic modulus (kg/mm$^2$) | | Bending strength (kg/mm$^2$) | |
|---|---|---|---|---|
| | Ambient temp. | 160° C. | Ambient temp. | 160° C. |
| Example 24-a | 1185 | 412 | 39 | 8 |
| Example 24-b | 1425 | 1175 | 47 | 31 |

EXAMPLE 25

This is an example of a molding composite to which a mold-releasing agent was added.

A sheet-shaped molding composite, 4 mm thick, containing a mold-releasing agent and a reinforcing fiber was prepared by compounding the following components and then by impregnating 30 parts of glass fiber (a chopped strand, 25 mm long) with the compound.

| | |
|---|---|
| Vinyl chloride resin (degree of polymerization: 3,500) | 25 parts |
| Bis(acryloyloxymethyl)tricyclo[5,2,1,0$^{2,6}$]decane | 25 parts |
| Zinc stearate | 0.6 part |
| Calcium stearate | 0.3 part |
| t-Butyl peroxybenzoate | 0.5 part |
| Dibutyltin bis(isooctyl acetomercaptide) | 0.5 part |
| Calcium carbonate (filler) | 20 parts |

A precursor was prepared with the composite by heating it at 80° C. for 10 minutes.

A fiber-reinforced molding was prepared with the precursor by placing it on a metal mold and then by heating and pressing it under the conditions: 130° C., 30 kg/cm$^2$ and 5 minutes.

Further, the molding operation was repeated 20 times with the same mold, from which every molding could be released quite easily.

The bending elastic modulus of the molding prepared was 1,390 kg/mm$^2$ and the bending strength was 39 kg/mm$^2$.

EXAMPLE 26

This is an example of composite for moldings to which a mold-releasing agent was added.

A composite containing a mold-releasing agent and a reinforcing fiber was prepared with the following components by the same procedure as Example 25.

| | |
|---|---|
| Vinyl chloride resin (degree of polymerization: 3,500) | 25 parts |
| Dimethacrylate of a propylene oxide adduct to hydrogenated bisphenol A | 5 parts |
| Bis(methacryloyloxymethyl)tricyclo[5,2,1,0$^{2,6}$]decane | 5 parts |
| Trimethylolpropane triacrylate | 15 parts |
| Zinc stearate | 0.5 part |
| Calcium stearate | 0.2 part |
| t-Butyl peroxybenzoate | 0.3 part |
| Dibutyltin bis(isooctyl acetomercaptide) | 0.3 part |
| Glass fiber | 30 parts |
| Calcium carbonate (filler) | 20 parts |

A fiber-reinforced molding was prepared by the same manner as in Example 25. The molding oparation was repeated 20 times with the same metal mold, from which every molding could be released quite easily.

The bending elastic modulus of the molding was 1,380 kg/mm$^2$ and the bending strength was 38 kg/mm$^2$.

What is claimed is:

1. A composite for moldings comprising:
   (A) at least a thermoplastic resin; and
   (B) a polymerizable monomer system which is:
      (B$_1$) an acrylate or methacrylate monomer having at least two ethylenically unsaturated polymerizable groups in the molecule and having a alicyclic structure unit, or
      a mixture consisting of said monomer (B$_1$) and (B$_2$) an acrylate or methacrylate monomer having only one ethylenically unsaturated polymerizable group in the molecule and having at least two alicyclic structure units,
   wherein the weight ratio of (A) to (B), based on the total weight of (A) and (B), ranges from 20:80 to 80:20.

2. The composite for moldings according to claim 1, wherein said thermoplastic resin (A) is a vinyl chloride resin.

3. The composite for moldings according to claim 2, which further comprises 15 to 300 parts by weight of a fiber per 100 parts by weight of the composite.

4. The composite for moldings according to claim 1, which further comprises 15 to 300 parts by weight of a fiber per 100 parts by weight of the composite.

5. The composite for moldings according to claim 1, wherein said monomer (B$_1$) is represented by the general formulae (1), (2) and (3):

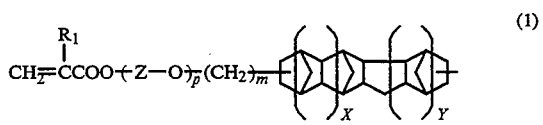

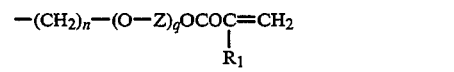

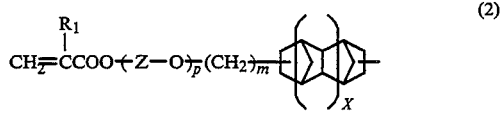

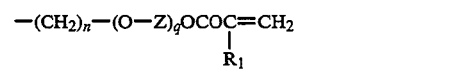

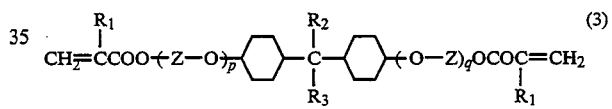

wherein, R$_1$, R$_2$ and R$_3$ are each hydrogen or a methyl group, Z is an ethylene or a propylene group, p and q are each a number of from 0 to 10 based on mole average value, m and n are each an integer of from 0 to 2, and, x and y are each an integer of from 0 to 3.

6. The composite for moldings according to claim 5, wherein said thermoplastic resin (A) is a vinyl chloride resin.

7. The composite for moldings according to claim 6, which further comprises 15 to 300 parts by weight of a fiber per 100 parts by weight of the composite.

8. The composite for moldings according to claim 5, which further comprises 15 to 300 parts by weight of a fiber per 100 parts by weight of the composite.

9. A precursor of moldings, which is prepared from the composite according to any one of claims 1 to 8, by heating at a temperature of 40° to 120° C., which is plasticized.

10. A molding which is prepared from the composite for moldings according to any one of claims 1 to 8.

11. The composite for moldings according to claim 2, which further comprises up to 10 parts by weight of a polymerization initiator per 100 parts by weight of total amount of the polymerizable monomer.

12. The composite for moldings according to claim 11, which further comprises 15 to 300 parts by weight of a fiber per 100 parts by weight of the composite.

* * * * *